(12) United States Patent
Vare et al.

(10) Patent No.: US 10,814,735 B2
(45) Date of Patent: Oct. 27, 2020

(54) CHARGING CONNECTOR ARRANGEMENT IN UNDERGROUND VEHICLE

(71) Applicant: SANDVIK MINING AND CONSTRUCTION OY, Tampere (FI)

(72) Inventors: Ville Vare, Tampere (FI); Mikko Kitula, Tampere (FI); Sami Haikio, Tampere (FI); Matti Joutsela, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 42 days.

(21) Appl. No.: 16/309,913

(22) PCT Filed: Jun. 16, 2017

(86) PCT No.: PCT/EP2017/064743
§ 371 (c)(1),
(2) Date: Dec. 13, 2018

(87) PCT Pub. No.: WO2017/216329
PCT Pub. Date: Dec. 21, 2017

(65) Prior Publication Data
US 2019/0255962 A1 Aug. 22, 2019

(30) Foreign Application Priority Data
Jun. 17, 2016 (EP) .................................... 16174977

(51) Int. Cl.
*B60L 50/60* (2019.01)
*B60L 53/302* (2019.01)
(Continued)

(52) U.S. Cl.
CPC .............. *B60L 53/302* (2019.02); *B60L 50/60* (2019.02); *B60L 53/16* (2019.02); *B60L 53/18* (2019.02);
(Continued)

(58) Field of Classification Search
CPC .......... B60L 50/60; B60L 53/16; B60L 53/18; B60L 53/302; B60L 53/66; B60L 58/26;
(Continued)

(56) References Cited

U.S. PATENT DOCUMENTS 8,535,104 B1 * 9/2013 Nida .................... B63H 21/383
180/68.2
2008/0193830 A1 * 8/2008 Buck ................... H01M 2/1077
429/120

(Continued)

FOREIGN PATENT DOCUMENTS

DE 102010007975 A1 * 8/2011 .............. B60L 50/40
DE 102010007975 A1 8/2011

*Primary Examiner* — Daniel Kessie
*Assistant Examiner* — Brian K Baxter
(74) *Attorney, Agent, or Firm* — Corrine R. Gorski

(57) ABSTRACT

An underground mining vehicle includes an electric motor for driving the vehicle and a rechargeable battery for supplying electric energy to the electric motor. A charging system is connected to an electric power source external to the vehicle for recharging the at least one rechargeable battery. A cooling system is connected to a cooling agent source external to the vehicle for cooling the rechargeable battery. At least one detection element for detecting the cooling system is connected to the external cooling agent source.

12 Claims, 3 Drawing Sheets

(51) Int. Cl.
*B60L 53/66* (2019.01)
*B60L 53/16* (2019.01)
*B60L 58/26* (2019.01)
*B60L 53/18* (2019.01)

(52) U.S. Cl.
CPC .............. *B60L 53/66* (2019.02); *B60L 58/26* (2019.02); *B60L 2200/40* (2013.01); *B60Y 2200/91* (2013.01); *B60Y 2300/91* (2013.01); *Y02T 10/7005* (2013.01); *Y02T 10/7088* (2013.01); *Y02T 90/121* (2013.01); *Y02T 90/14* (2013.01)

(58) Field of Classification Search
CPC ............ B60L 2200/40; B60Y 2200/91; B60Y 2300/91; Y02T 10/7005; Y02T 10/7088; Y02T 90/121; Y02T 90/14
USPC ......................................................... 307/10.1
See application file for complete search history.

(56) References Cited

U.S. PATENT DOCUMENTS

| | | | |
|---|---|---|---|
| 2009/0021221 A1* | 1/2009 | Krauer | B60L 58/27 320/153 |
| 2010/0328057 A1 | 12/2010 | Liu | |
| 2012/0189893 A1* | 7/2012 | Lachenmeier | B60L 1/003 429/120 |
| 2012/0304866 A1* | 12/2012 | Barrett | B01D 53/74 96/244 |
| 2013/0252448 A1* | 9/2013 | Schulte | H01R 13/6397 439/304 |
| 2013/0298588 A1* | 11/2013 | Jojima | B60L 58/26 62/259.2 |
| 2014/0191718 A1 | 7/2014 | Reineccius et al. | |
| 2016/0134001 A1 | 5/2016 | Lindholm et al. | |
| 2019/0329670 A1* | 10/2019 | Kouvo | B60L 58/25 |

* cited by examiner

CHARGING CONNECTOR ARRANGEMENT IN UNDERGROUND VEHICLE

RELATED APPLICATION DATA

This application is a § 371 National Stage Application of PCT International Application No. PCT/EP2017/064743 filed Jun. 16, 2017 claiming priority to EP 16179977.5 filed Jun. 17, 2016.

FIELD OF THE INVENTION

The invention relates to an underground mining vehicle.

BACKGROUND OF THE INVENTION

Underground mining vehicles are typically provided with one or more combustion engines, these typically being diesel engines. A combustion engine requires a lot of space on a carriage of the vehicle, and necessitates regular maintenance. A combustion engine also has adverse effects on fire safety in a mine, since it has hot surfaces and it is also necessary to store and handle flammable fuel in the vehicle and the mine. Furthermore, in underground mines exhaust gases from the combustion engines must be ventilated out of the mine what increases the total energy consumption of underground mining considerably.

It is also possible to provide the underground mining vehicle with one or more electric motors such that at least the drive motor of the underground mining vehicle is an electric drive motor. Electric power to the electric drive motor may be supplied from a rechargeable battery provided in the vehicle.

BRIEF DESCRIPTION OF THE INVENTION

An object of the present invention is to provide a novel underground mining vehicle.

The invention is characterized by the features disclosed in the independent claims.

An underground mining vehicle comprises at least one electric motor for driving the vehicle and at least one rechargeable battery for supplying electric energy to the electric motor. Furthermore the underground mining vehicle comprises at least one charging system comprising at least one charging circuit and at least one charging connection connected to the charging system for supplying electric energy to the charging system from an electric power source external to the vehicle for recharging the at least one rechargeable battery, at least one cooling system comprising at least one cooling circuit and at least one cooling agent supply connection connected to the cooling system for supplying cooling agent to the cooling system from a cooling agent source external to the vehicle for cooling the at least one rechargeable battery and at least one detection element for detecting the cooling system being connected to the external cooling agent source.

The advantage of the invention is that the rechargeable battery may be cooled by using cooling agent supplied from a cooling agent source external to vehicle during recharging of the battery, and without any need to remove the battery from the vehicle for recharging. Furthermore, with the detection element for detecting the cooling system being connected to the external cooling agent source it is possible to prevent a starting of the vehicle accidentally in the event of the cooling agent supply line from the cooling agent source external to the vehicle still being connected to the cooling system of the rechargeable battery in the vehicle.

Some embodiments of the invention are disclosed in the dependent claims.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the figures.

DETAILED DESCRIPTION OF THE INVENTION

Figure 1:
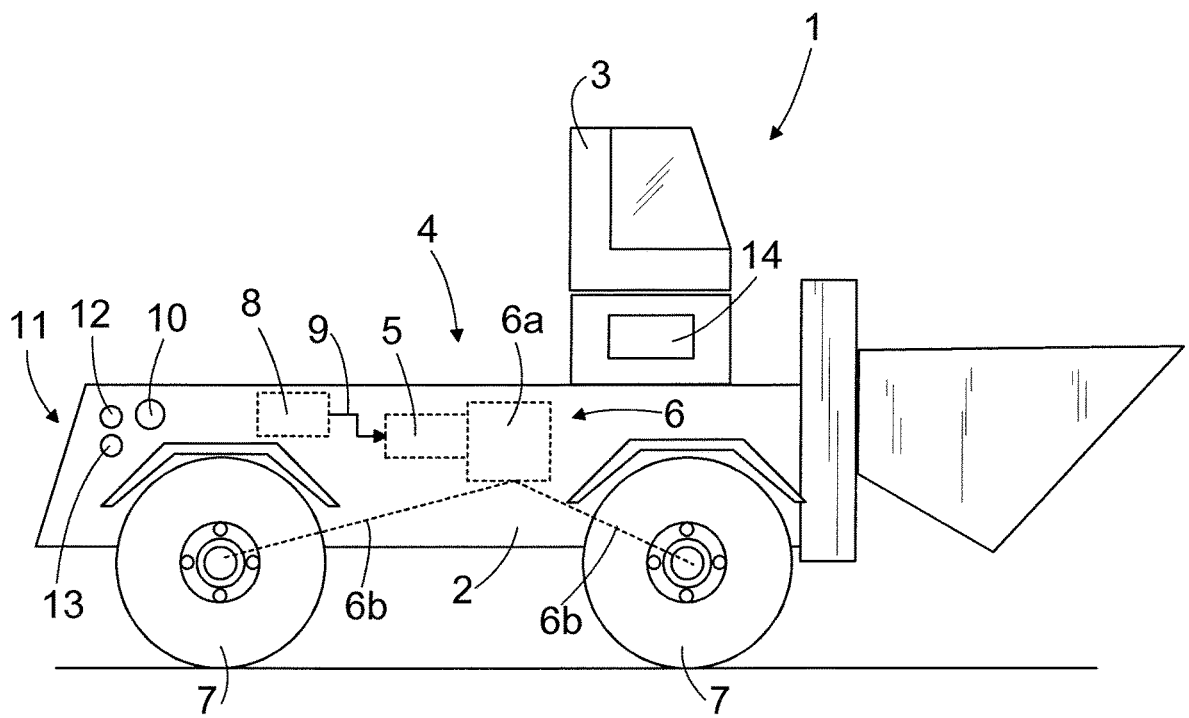
FIG. 1 is a schematic side view of an underground mining vehicle.

FIG. 1 shows schematically a side view of an underground mining vehicle 1, which may later in this description be called also a mining vehicle 1 or a vehicle 1. The vehicle 1 comprises a carriage 2 and a cabin 3 or a canopy 3 placed onto the carriage 2. The vehicle 1 may be moved by means of drive equipment 4. The drive equipment 4 comprises one or more electric motors 5 providing one or more drive motors of the underground mining vehicle 1, and power transmission means 6, such as a gearbox 6a and driving axles 6b, for transmitting drive power to one or more wheels 7. Alternatively one or more electric motors 5 may be connected directly to one or more wheels 7 so as to provide drive power to one or more wheels 7.

The underground mining vehicle 1 further comprises at least one rechargeable battery 8 for providing electric power to the electric motor 5 for moving the vehicle 1. This connection between the battery 8 and the motor 5 is shown schematically with an arrow 9. There may also be additional power electronics between the rechargeable battery 8 and the electric motor 5 for transforming the electric power supplied from the battery 8 to a form suitable for the electric motor 5. Further the vehicle 1 comprises one or more charging connections 10 for connecting the vehicle 1 to an external electric power source for recharging the rechargeable battery 8. Further the vehicle 1 comprises one or more cooling agent supply connections 11 for connecting the vehicle 1 to an external cooling agent source for cooling the rechargeable battery 8 during the recharging of the battery 8, if necessary. The cooling agent supply connection 11 comprises a cooling agent inlet connection 12 or an inlet connection 12 for an inlet flow of cooling agent into a battery cooling system as well as a cooling agent outlet connection 13 or an outlet connection 13 for an outlet flow of cooling agent out from the battery cooling system.

The underground mining vehicle 1 further comprises one or more control units 14 to control at least some operations of the vehicle 1, such as a recharging of the at least one rechargeable battery 8 and a cooling of the at least one rechargeable battery 8.

The underground mining vehicle 1 may be a dumper, a loader, a rock drilling rig or any other mining vehicle. The underground mining vehicle 1 may be equipped with one or more mining work devices which mining work device may be one or more of the following mining work devices: rock drilling machine, bolting machine, shotcreting device, scaling device, injection device, blasthole charger, loading device, bucket, box, measuring device, or drilling, sealing and propellant feeding equipment used in small-charge excavation.

Figure 2:
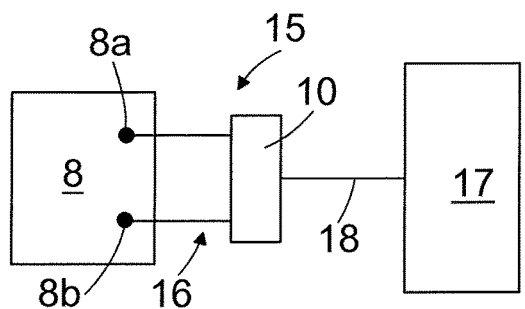
FIG. 2 is a schematic view of a charging system for a rechargeable battery in an underground mining vehicle.

FIG. 2 is a schematic view of a charging system 15 for the rechargeable battery 8 in the underground mining vehicle 1 for recharging the battery 8. The charging system 15 comprises at least one charging circuit 16 connected to a positive terminal 8a of the battery 8 and a negative terminal 8b of the battery 8. The charging system 15 further comprises the charging connection 10. The charging system 15 may be connected to an electric power source 17 external to the vehicle 1 through a charging cable 18 to be connected from the electric power source 17 to the charging connection 10 in the vehicle 1. The electric power source 17 may for example be a specific charging station connected to an electric power system of the underground mine and intended only for recharging of the rechargeable batteries 8 remaining in the vehicle 1. Alternatively the electric power source 17 may be a large current output in the electric power system of the underground mine, for example.

Figure 3:
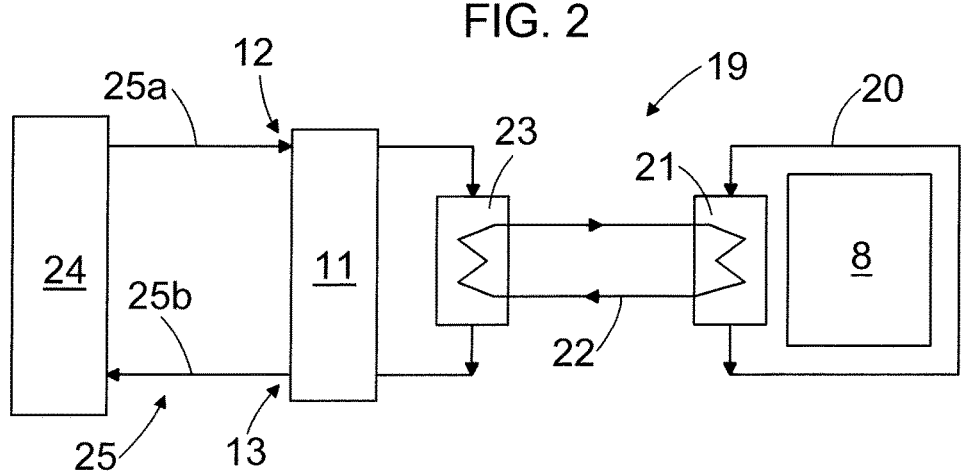
FIG. 3 is a schematic view of a cooling system for a rechargeable battery in an underground mining vehicle.

FIG. 3 is a schematic view of a cooling system 19 for the rechargeable battery 8 in the underground mining vehicle 1. The cooling system 19 comprises a first cooling circuit 20, wherein cooling agent, i.e. cooling medium, is arranged to flow and to receive excessive heat from the battery 8, especially during the recharging of the battery 8. Cooling agent is circulated in the first cooling circuit 20 by using a pump that is not shown in FIG. 3 for the sake of clarity.

The cooling system 19 comprises also a second cooling circuit 22, wherein also cooling agent is arranged to flow and receive excessive heat from cooling agent flowing in the first cooling circuit 20 by a first heat exchanger 21 remaining between the first cooling circuit 20 and the second cooling circuit 22. Cooling agent is circulated in the second cooling circuit 22 by using a pump that is also not shown in FIG. 3 for the sake of clarity.

The cooling system 19 further comprises a second heat exchanger 23 in the second cooling circuit 22 and the cooling agent supply connection 11 comprising the cooling agent inlet connection 12 and the cooling agent outlet connection 13. The cooling system 19 may be connected to a cooling agent source 24 external to the vehicle 1 through a cooling agent supply line 25 to be connected to the cooling agent supply connection 11 in the vehicle 1. The cooling agent supply line 25 comprises a cooling agent inlet flow line 25a to be connected to the cooling agent inlet connection 12 in the cooling agent supply connection 11, through which cooling agent supplied by the external cooling agent source 24 is supplied to the second heat exchanger 23. In the second heat exchanger 23 cooling agent flow from the external cooling agent source 24 receives excessive heat from cooling agent flowing in the second cooling circuit 22. The cooling agent supply line 25 comprises also a cooling agent outlet flow line 25b to be connected to the cooling agent outlet connection 13 in the cooling agent supply connection 11, through which cooling agent supplied originally from the external cooling agent source 24 to the second heat exchanger 23 and heated therein is returned back to the external cooling agent source 24. The external cooling agent source 24 comprises a pump, which again is not shown in FIG. 3 for the sake of clarity, for providing the cooling agent flow in the cooling agent supply line 25.

In the embodiment disclosed in FIG. 3 the first cooling circuit 20 and the first heat exchanger 21 therein, as well as the second cooling circuit 22 and the second heat exchanger 23 therein thus belong to the cooling system 19 being part of the underground mining vehicle 1. The second cooling circuit 22 is arranged to provide an intermediate cooling circuit between the first cooling circuit 20 and a cooling circuit provided by the external cooling agent source 24 and the cooling agent supply line 25. Alternatively the cooling agent supply line 25 could be connected straight to the first heat exchanger 21, whereby the second cooling circuit 22 and the second heat exchanger 23 therein may be left away from the mining vehicle 1.

The cooling agent source 24 may for example be a water storage for mining operations or a water distribution system of the underground mine.

Figure 4:
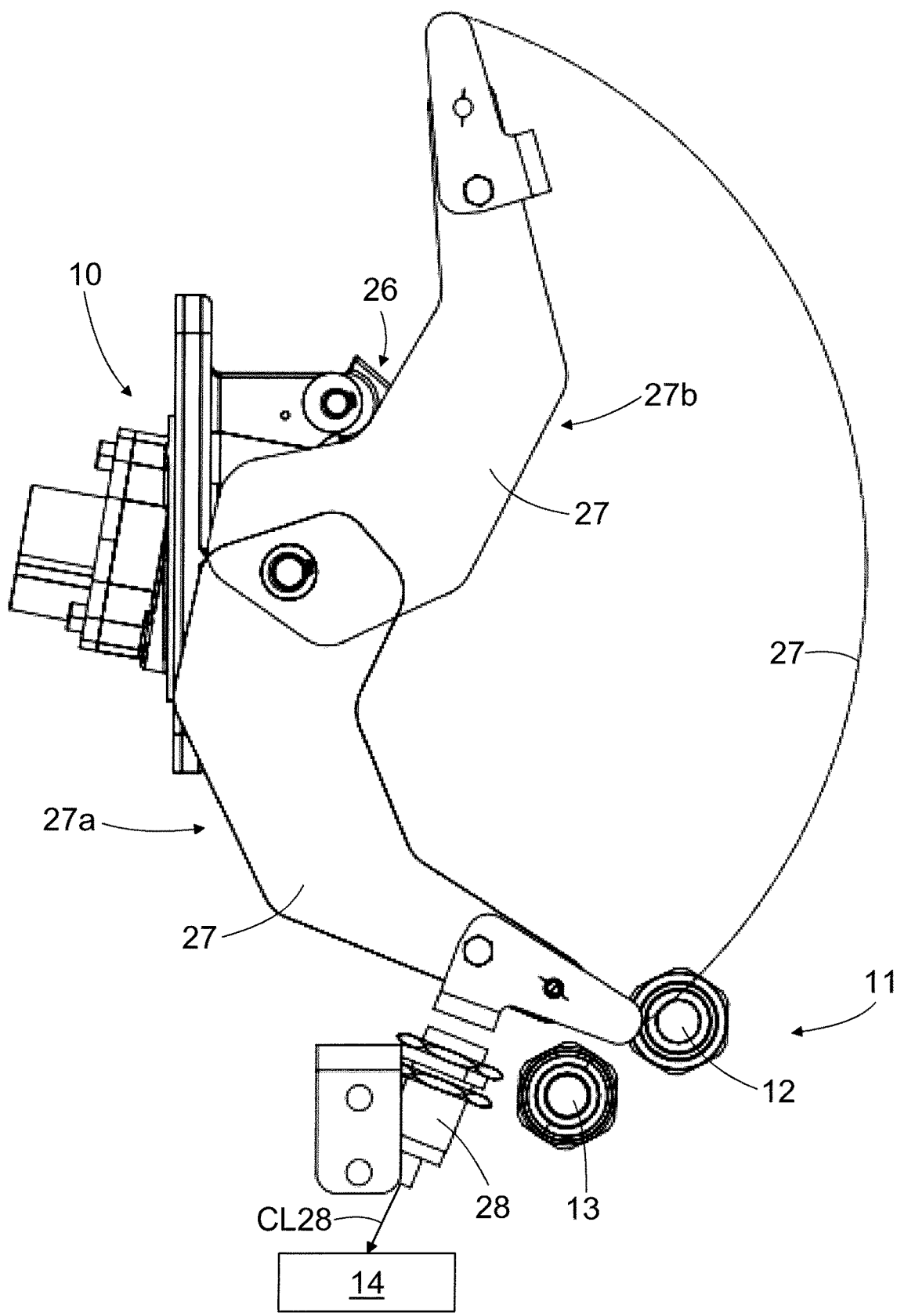
FIG. 4 is a schematic view of an embodiment for detecting both a cooling system of a rechargeable battery being connected to an external cooling agent source and a charging system of a rechargeable battery being connected to an external electric power source.

FIG. 4 shows schematically an embodiment for detecting both the cooling system 19 of the rechargeable battery 8 being connected to the external cooling agent source 24 and the charging system 15 of the rechargeable battery 8 being connected to the external electric power source 17.

FIG. 4 shows the charging connection 10 arranged at a side of the vehicle 1. Further FIG. 4 shows a cover 26 for covering the charging connection 10 when the charging cable 18 from the external electric power source 17 is not connected to the charging connection 10, as is the situation in FIG. 4. The cover 26 is operated by a handle 27 connected to the cover 26 so that when the charging cable 18 from the external electric power source 24 is not connected to the charging connection 10, as is the situation in FIG. 4, the cover 26 may be closed by turning the handle 27 downwards to the lower position 27a. When the charging cable 18 from the external electric power source 24 is to be connected to the charging connection 10, the cover 26 is opened by turning the handle 27 upwards to the upper position 27b. Turning of the handle is schematically presented by a curved line 27'.

FIG. 4 further shows the cooling agent supply connection 11 next to the charging connection 10 and comprising the cooling agent inlet connection 12 and the cooling agent outlet connection 13. When at least the cooling agent inlet flow line 25a of the cooling agent supply line 25 from the external cooling agent source 24 is connected to the cooling agent inlet connection 12, the handle 27 is physically prevented to turn downwards to the lower position 27a for closing the cover 26 by the cooling agent inlet flow line 25a being connected to the cooling agent inlet connection 12. Also an alternative embodiment may be provided, wherein if at least the cooling agent outlet flow line 25b of the cooling agent supply line 25 from the external cooling agent source 24 is connected to the cooling agent outlet connection 12, the handle 27 is physically prevented to turn downwards to the lower position 27a for closing the cover 26 by the cooling agent outlet flow line 25b being connected to the cooling agent outlet connection 13.

The vehicle 1 of FIG. 4 further comprises a position sensor 28, which may have an implementation of a mechanical switch or an electronic sensor such as capacitive or inductive sensor, which is arranged to change its state in response to turning the handle 27 to the lower position 27a for closing the cover 26 and in response to turning the handle 27 to the upper position 27b for opening the cover 27.

When the handle 27 is turned to the lower position 27a, the handle 27 will turn against the position sensor 28 or close to it and close the cover 26, if the charging cable 10 has been disconnected from the charging connection 10 and if the cooling agent inlet flow line 25a and/or the cooling agent outlet flow line 25b of the cooling agent supply line 25 from the external cooling agent source 24 have been disconnected from the cooling agent inlet connection 12 and from the cooling agent outlet connection 13, i.e. if the cooling agent supply line 25 from the external cooling agent source 24 has been disconnected from the cooling agent supply connection 11. When the handle 27 turns against the position sensor 28 or close to it, the position sensor 28 activates and sends a control signal CL28 to the control unit 14 informing that the vehicle 1 is disconnected from the external electric power source 17 and from the external cooling agent source 24, whereby the vehicle 1 is allowed to start or move. The control signal CL28 remains activated as long as the handle 27 is turned against the position sensor 28 or close to it.

If the control signal CL28 is not activated, i.e. there is no active control signal CL28, it means that the handle 27 has not been turned to the lower position 27a, whereby the charging cable 18 may still be connected to the charging connection 10, or that at least one of the cooling agent inlet flow line 25a and the cooling agent outlet flow line 25b of the cooling agent supply line 25 from the external cooling agent source 24 may still be connected to the cooling agent inlet connection 12 or to the cooling agent outlet connection 13, i.e. the cooling agent supply line 25 from the external cooling agent source 24 may still be connected to the cooling agent supply connection 11. Alternatively the lack of the active control signal CL28 may originate from a malfunction of the position sensor 28. In all these cases the starting of the vehicle 1 is prevented by the control unit 14 in response to the lack of the active control signal CL28.

The position sensor 28 provides an embodiment of the detection element which is able to detect, in the embodiment of FIG. 4 in co-operation with the cover 26 and the handle 27, at least one of the charging system 15 of the rechargeable battery 8 being connected to the external electric power source 17 and the cooling system 19 of the rechargeable battery 8 being connected to the external cooling agent source 24, and in response to that provide the control signal CL28 to the control unit 14 for preventing the starting of the vehicle 1.

In the embodiment disclosed in FIG. 4 the control unit 14 is thus configured to prevent the starting of the underground mining vehicle 1 in response to the detection element, i.e. the position sensor 28, detecting the underground mining vehicle 1 being connected to the external cooling agent source 24, or detecting the underground mining vehicle 1 being connected to the external electric power source 17, or detecting the underground mining vehicle 1 being connected to the external cooling agent source 24 and the external electric power source 17.

Alternatively, or in addition to the sending of the control signal CL28 to the control unit 14 of the vehicle 1, the control signal CL28 indicating at least one of the charging system 15 of the rechargeable battery 8 being connected to the external electric power source 17 and the cooling system 19 of the rechargeable battery 8 being connected to the external cooling agent source 24 is informed to an operator of the vehicle 1.

Figure 5:
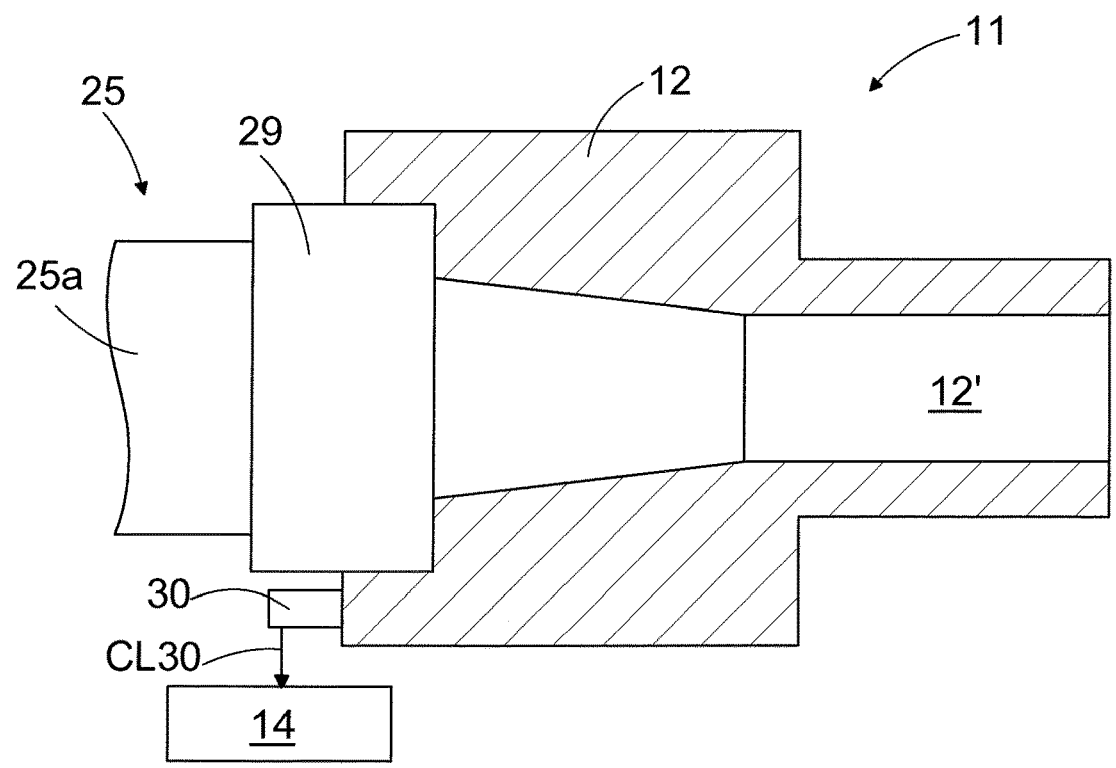
FIG. 5 is a schematic side view of an embodiment for detecting a cooling system of a rechargeable battery being connected to an external cooling agent source.

FIG. 5 is a schematic side view of an embodiment for detecting the cooling system 19 of the rechargeable battery 8 being connected to the external cooling agent source 24.

FIG. 5 discloses a cross-sectional view of a cooling agent inlet connection 12 with an internal flow channel 12' remaining in the vehicle 1. Furthermore FIG. 5 discloses a head 29 of the cooling agent inlet flow line 25a of the cooling agent supply line 25 connected to the cooling agent inlet connection 12. The embodiment of FIG. 5 further discloses a proximity sensor 30 arranged at the cooling agent inlet connection 12 of the cooling agent supply connection 11. The proximity sensor 30 is arranged to activate a control signal CL30 indicating the cooling agent inlet flow line 25a being connected to the cooling agent inlet connection 12 in response to the cooling agent inlet flow line 25a being connected to the cooling agent inlet connection 12, i.e. to activate a control signal CL30 indicating the cooling agent supply line 25 being connected to the cooling agent supply connection 11 in response to the cooling agent supply line 25 being connected to the cooling agent supply connection 11.

The proximity sensor 30 may for example be a capacitive sensor on an inductive sensor, whereby the proximity sensor 30 is arranged to detect the presence of the head 29 being connected to the cooling agent inlet connection 12, what indicates that the cooling agent inlet flow line 25a is connected to the cooling agent inlet connection 12, i.e. that the cooling agent supply line 25 is connected to the cooling agent supply connection 11

In this embodiment the control signal CL30 is activated in response to the head 29 of the cooling agent inlet flow line 25a being connected to the cooling agent inlet connection 12 but with a suitable electronics a state of the control signal CL30 may be reversed in such a way that the control signal CL30 is activated when the head 29 of the cooling agent inlet flow line 25 is disconnected from the cooling agent inlet connection 12. In that case the non-active state of the control signal CL30 indicates that the cooling agent inlet flow line 25a is connected to the cooling agent inlet connection 12, or that there is a malfunction in the detection element, i.e. in the proximity sensor 30.

When the cooling agent supply line 25 is detected to be connected to the cooling agent supply connection 11, the control unit 14 is configured to prevent the starting of the vehicle 1 in response to receiving a control signal CL30 indicating that the cooling agent supply line 25 is connected to the cooling agent supply connection 11.

The arrangement like that of FIG. 5 may also be utilized in connection with the cooling agent outlet flow connection 13 for detecting whether the cooling agent outlet flow line 25b of the cooling agent supply line 25 is connected to the cooling agent outlet connection 13 of the cooling agent supply connection 11.

The arrangement of FIG. 5 may also be replaced with an arrangement, wherein a proximity sensor is a mechanical switch, which is arranged in connection with the cooling agent supply connection 11, i.e. in connection with at least one of the cooling agent inlet connection 12 and the cooling agent outlet connection 13. In this embodiment a state of the mechanical switch is arranged to change in response to a head of the at least one of the cooling agent inlet flow line 25a and the cooling agent outlet flow line 25b being connected to the cooling agent inlet connection 12 or the cooling agent outlet connection 13.

In the embodiment disclosed in FIG. 5 the control unit 14 is thus configured to prevent the starting of the underground mining vehicle 1 in response to the detection element, i.e.

the proximity sensor 30, detecting the underground mining vehicle 1 being connected to the external cooling agent source 24.

Alternatively, or in addition to the sending of the control signal CL30 to the control unit 14 of the vehicle 1, the control signal CL30 indicating the cooling system 19 of the rechargeable battery 8 being connected to the external cooling agent source 24 is informed to an operator of the vehicle 1.

Figure 6:
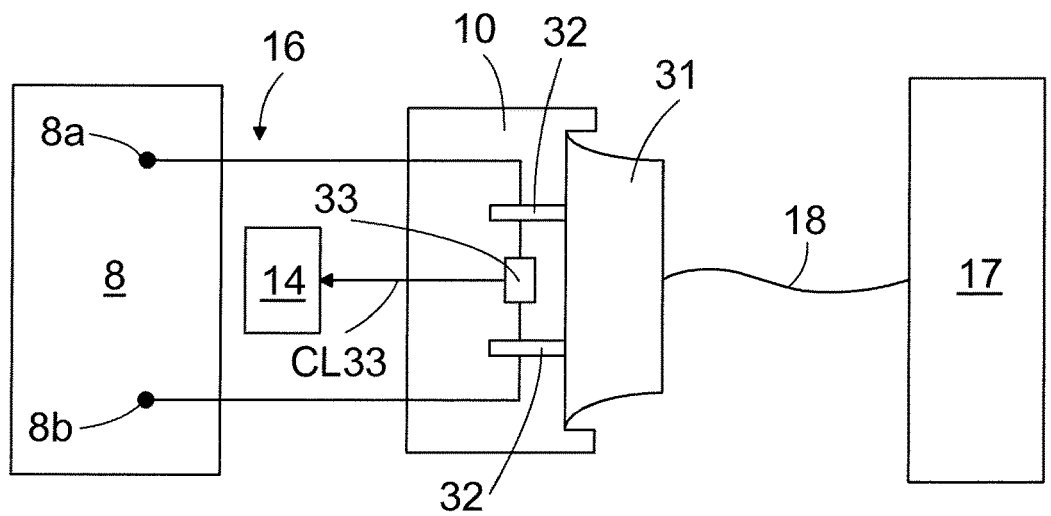
FIG. 6 is a schematic side view of an embodiment for detecting a charging system of a rechargeable battery being connected to an external electric power source.

FIG. 6 shows schematically a side view of an embodiment for detecting the charging system 15 of the rechargeable battery 8 being connected to the external electric power source 17. FIG. 6 shows the rechargeable battery 8, the charging circuit 16 and the charging connection 10. The charging connection 10 is implemented with a contact box. The battery 8 is charged from the external electric power source 17 through the charging cable 18 and a socket 31 at the end of the charging cable 18, the socket 31 being connected to the charging connection 10. The socket 31 has pins 32 which are arranged to close the charging circuit 16 for recharging the battery 8.

The embodiment of FIG. 6 further comprises, in connection with at least one of the charging connection 10 and the charging circuit 16, an interlock circuit 33 for detecting the recharging of the battery 8 being active, or the charging cable 18 being connected to the charging connection 10. The interlock circuit 33 is configured to provide a control signal CL33 to the control unit 14 in response to the charging cable 18 being connected to the charging connection 10 in the vehicle 1, whereby the control unit 14 is configured to prevent the starting of the vehicle 1. The interlock circuit 33 thus provides a kind of a detection element to provide a control signal indicating the charging cable 18 being connected to the charging connection 10 in the vehicle 1 in response to the charging cable 18 being connected to the charging connection 10, i.e. in response to the external electric power source 17 being connected to the charging system 15 of the rechargeable battery 8.

In the embodiment of FIG. 6 the control signal CL33 is activated in response to the socket 31 of the charging cable 18 being connected to the charging connection 10 but with a suitable electronics a state of the control signal CL33 may also be reversed in such a way that the control signal CL33 is activated when the socket 31 of the charging cable 18 is disconnected from the charging connection 10. In that case a non-active state of the control signal CL33, or the lack of the control signal CL33, indicates that the socket 31 of the charging cable 18 is connected to the charging connection 10 or that there is a malfunction in the detection element intended to detect the charging system 15 of the rechargeable battery 8 being connected to the external electric power source 17.

In the embodiment disclosed in FIG. 6 the control unit 14 is thus configured to prevent the starting of the underground mining vehicle 1 in response to the detection element, i.e. the interlock circuit 33, detecting the underground mining vehicle 1 being connected to the external electric power source 17.

Alternatively, or in addition to the sending of the control signal CL33 to the control unit 14 of the vehicle 1, the control signal CL33 indicating the charging system 15 of the rechargeable battery 8 being connected to the external electric power source 17 is informed to an operator of the vehicle 1.

The advantage of the solution is that the rechargeable battery 8 may be cooled by using cooling agent supplied from a cooling agent source external to vehicle during recharging of the battery, without any need to remove the battery from the vehicle for recharging.

Furthermore, it is possible to detect and inform the operator of the underground mining vehicle 1 that the cooling system 19 of the rechargeable battery 8 is connected to the external cooling agent source 24, and additionally also that the charging system 15 of the rechargeable battery 8 is connected to the external electric power source 17. This prevents the operator to accidentally start the vehicle, whereby no damages are caused to the vehicle 1, the charging cable 18, the external electric power source 17, the cooling agent supply line 25 or the external cooling agent source 24. According to an embodiment the control unit of the mining vehicle 1 may be configured to automatically prevent the starting of the vehicle 1 in response to the at least one of the charging system 15 of the rechargeable battery 8 being connected to the external electric power source 17 and the cooling system 19 of the rechargeable battery 8 being connected to the external cooling agent source 24.

It will be obvious to a person skilled in the art that, as the technology advances, the inventive concept can be implemented in various ways. The invention and its embodiments are not limited to the examples described above but may vary within the scope of the claims.

The invention claimed is:

1. An underground mining vehicle comprising:
   at least one electric motor for driving the vehicle;
   at least one rechargeable battery for supplying electric energy to the electric motor;
   at least one charging system including at least one charging circuit and at least one charging connection connected to the charging system for supplying electric energy to the charging system from an electric power source external to the vehicle for recharging the at least one rechargeable battery;
   at least one cooling system including at least one cooling circuit and at least one cooling agent supply connection connected to the cooling system for supplying cooling agent to the cooling system from a cooling agent source external to the vehicle for cooling the at least one rechargeable battery;
   a cover for covering the at least one charging connection in response to a charging cable being not connected to the at least one charging connection and a handle connected to the cover for opening and closing the cover in response to a turning of the handle to an open and a closed position, wherein the handle is mechanically prevented by the at least one cooling agent supply line to turn into the closed position for closing the cover in response to the cooling agent supply line being connected to the cooling agent supply connection;
   at least one detection element arranged for detecting the cooling system connected to the external cooling agent source in response to the handle when not turned to the closed position; and
   at least one control unit for controlling at least one operation of the underground mining vehicle, the at least one detection element being connected to the control unit, wherein the control unit is configured to prevent a starting of the underground mining vehicle in response to the at least one detection element indicating the underground mining vehicle being connected to the external cooling agent source.

2. The underground mining vehicle as claimed in claim 1, further comprising at least one detection element for detecting the charging system connected to the external electric power source.

3. The underground mining vehicle as claimed in claim 2, wherein the detection element for detecting the charging system being connected to the external electric power source is an interlock circuit arranged in connection with the charging connection and arranged to provide a control signal indicating the charging connection being connected to the external electric power source in response to the charging cable being connected to the charging connection.

4. The underground mining vehicle as claimed in claim 1, wherein the at least one detection element is arranged to detect both the cooling system being connected to the external cooling agent source and the charging system being connected to the external electric power source.

5. The underground mining vehicle as claimed in claim 1, wherein the control unit is configured to prevent a starting of the underground mining vehicle in response to the at least one detection element indicating at least one of the charging cable from the external electric power source being connected to the charging connection of the vehicle and the at least one cooling agent supply line from the external cooling agent source being connected to the cooling agent supply connection of the vehicle.

6. The underground mining vehicle as claimed in claim 1, wherein the detection element for detecting the cooling system being connected to the external cooling agent source is a proximity sensor arranged in connection with the cooling agent supply connection and arranged to provide a control signal indicating the cooling agent supply connection being connected to the external cooling agent source in response to the cooling agent supply line being connected to the cooling agent supply connection.

7. The underground mining vehicle as claimed in claim 6, wherein the proximity sensor is one of a capacitive sensor and an inductive sensor.

8. The underground mining vehicle as claimed in claim 1, wherein the detection element for detecting the cooling system being connected to the external cooling agent source is a mechanical switch arranged in connection with the cooling agent supply connection and arranged to change its state in response to connecting the cooling agent supply line to the cooling agent supply connection and in response to disconnecting the cooling agent supply line from the cooling agent supply connection.

9. The underground mining vehicle as claimed in claim 1, wherein the at least one detection element for detecting at least one of the cooling system being connected to the external cooling agent source and the charging system being connected to the external electric power source is a position sensor which is arranged to change its state in response to turning the handle into the closed position for closing the cover and in response to turning the handle into the open position for opening the cover.

10. An arrangement for charging a rechargeable battery in an underground mining vehicle as claimed in claim 1, wherein the cooling agent is water and the cooling agent source external to the vehicle is a water storage for mining operations.

11. A method for a battery operated underground mining vehicle comprising:
charging at least one rechargeable battery using at least one charging system including at least one charging circuit and at least one charging connection connected to the charging system to which charging connection electric energy is supplied from an electric power source external to the vehicle for recharging the battery;
cooling the at least one rechargeable battery using at least one cooling system including at least one cooling circuit and at least one cooling agent supply connection connected to the cooling system to which cooling agent supply connection cooling agent is supplied from a cooling agent source external to the vehicle for cooling the at least one rechargeable battery, the underground mining vehicle including a cover for covering the at least one charging connection in response to the charging cable being not connected to the charging connection and a handle connected to the cover for opening and closing the cover in response to a turning of the handle to an open and a closed position, wherein the handle is mechanically prevented by the cooling agent supply line to turn into the closed position for closing the cover in response to the cooling agent supply line being connected to the cooling agent supply connection;
detecting by at least one detection element whether the cooling system is connected to the external cooling agent source; and
preventing a starting of the underground mining vehicle in response to the at least one detection element indicating the underground mining vehicle being connected to the external cooling agent source.

12. The method as claimed in claim 11, further comprising detecting by at least one detection element whether the charging system is connected to the external electric power source and preventing a starting of the underground mining vehicle in response to the at least one detection element indicating the underground mining vehicle being connected to one of the external electric power source and the external cooling agent source.

* * * * *